US010510307B2

(12) United States Patent
Liao et al.

(10) Patent No.: US 10,510,307 B2
(45) Date of Patent: Dec. 17, 2019

(54) ARRAY SUBSTRATE AND DISPLAY DEVICE

(71) Applicant: BOE TECHNOLOGY GROUP CO., LTD., Beijing (CN)

(72) Inventors: Feng Liao, Beijing (CN); Xue Dong, Beijing (CN); Jing Lv, Beijing (CN); Yunsik Im, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 20 days.

(21) Appl. No.: 15/755,874

(22) PCT Filed: Sep. 1, 2017

(86) PCT No.: PCT/CN2017/100143
§ 371 (c)(1),
(2) Date: Feb. 27, 2018

(87) PCT Pub. No.: WO2018/133424
PCT Pub. Date: Jul. 26, 2018

(65) Prior Publication Data
US 2018/0343366 A1 Nov. 29, 2018

(30) Foreign Application Priority Data
Jan. 20, 2017 (CN) .......................... 2017 1 0051837

(51) Int. Cl.
G09G 3/36 (2006.01)
G02F 1/1335 (2006.01)

(52) U.S. Cl.
CPC ....... G09G 3/364 (2013.01); G02F 1/133512 (2013.01); G02F 2201/52 (2013.01);
(Continued)

(58) Field of Classification Search
CPC .......... G09G 3/364; G09G 2300/0452; G09G 2300/0465; G09G 2300/0439; G02F 1/1362; G02F 1/1335
See application file for complete search history.

(56) References Cited

U.S. PATENT DOCUMENTS 5,461,503 A * 10/1995 Deffontaines ..... G02F 1/133514
349/109
2003/0151568 A1 * 8/2003 Ozawa ..................... G09G 3/30
345/82
(Continued)

FOREIGN PATENT DOCUMENTS

CN 101140375 A 3/2008
CN 103076704 A 5/2013
(Continued)

OTHER PUBLICATIONS

Written Opinion and International Search Report from PCT Application No. PCT/CN2017/100143 dated Nov. 27, 2017 (4 pages).
(Continued)

Primary Examiner — Liliana Cerullo
(74) Attorney, Agent, or Firm — Harness, Dickey & Pierce, P.L.C.

(57) ABSTRACT

The embodiments of the present disclosure provide an array substrate. The array substrate includes a plurality of pixel groups arranged along a column direction. Each of the plurality of pixel groups includes a plurality of sub-pixel rows. Each sub-pixel row includes a plurality of sub-pixels, a first shelter or a second shelter is arranged between two adjacent sub-pixels, and the first shelter and the second shelter are arranged alternately. The first shelter has a first width, and the second shelter has a second width. For each pixel group, the first shelters on at least one of the sub-pixel rows are aligned with the second shelters on at least one of other sub-pixel rows.

13 Claims, 10 Drawing Sheets

(52) U.S. Cl.
CPC .............. *G09G 2300/0439* (2013.01); *G09G 2300/0452* (2013.01); *G09G 2300/0465* (2013.01)

(56) References Cited

U.S. PATENT DOCUMENTS

| | | |
|---|---|---|
| 2008/0055500 A1 | 3/2008 | Maeda |
| 2010/0001939 A1 | 1/2010 | Ochiai et al. |
| 2016/0357070 A1 | 12/2016 | Yang et al. |
| 2017/0169779 A1 | 6/2017 | Song et al. |
| 2017/0219867 A1 | 8/2017 | Guo et al. |

FOREIGN PATENT DOCUMENTS

| | | |
|---|---|---|
| CN | 104597675 A | 5/2015 |
| CN | 104865737 A | 8/2015 |
| CN | 105158993 A | 12/2015 |

OTHER PUBLICATIONS

International Search Report from PCT Application No. PCT/CN2017/100143 dated Nov. 27, 2017 (5 pages).

\* cited by examiner

ARRAY SUBSTRATE AND DISPLAY DEVICE

CROSS-REFERENCE TO RELATED APPLICATION

This application claims the benefit and priority of Chinese Patent Application No. 201710051837.2 filed on Jan. 20, 2017, the entire content of which is incorporated herein by reference as a part of the present application.

TECHNICAL FIELD

The present disclosure generally relates to the field of display technologies, and more particularly, to an array substrate and a display device.

BACKGROUND

With the constant development of display technologies, array substrates are widely used in display panels.

SUMMARY

An embodiment set forth herein provides a new-type array substrate and a display device.

A first aspect of the present disclosure provides an array substrate. The array substrate includes a plurality of pixel groups arranged along a column direction. Each of the plurality of pixel groups includes a plurality of sub-pixel rows. Each sub-pixel row includes a plurality of sub-pixels, a first shelter or a second shelter is arranged alternately between two adjacent sub-pixels. The first shelter has a first width, and the second shelter has a second width. For each pixel group, the first shelters on at least one of the sub-pixel rows are aligned with the second shelters on at least one of other sub-pixel rows.

In embodiments of the present disclosure, the first width is different from the second width.

In embodiments of the present disclosure, for each pixel group, sub-pixels of the same color on different sub-pixel rows are aligned with one another.

In embodiments of the present disclosure, each pixel group includes two sub-pixel rows, the first shelters on one sub-pixel row are aligned with the second shelters on the other sub-pixel row, and the second shelters on the one sub-pixel row are aligned with the first shelters on the other sub-pixel row.

In embodiments of the present disclosure, each pixel group is divided into two pixel subgroups along the column direction. In each pixel subgroup, the first shelters on different sub-pixel rows are aligned with one another, and the second shelters on different sub-pixel rows are aligned with one another. The first shelters on each sub-pixel row of one pixel subgroup of the two pixel subgroups are aligned with the second shelters on each sub-pixel row of the other pixel subgroup, and the second shelters on each sub-pixel row of the one pixel subgroup are aligned with the first shelters on each sub-pixel row of the other pixel subgroup.

In embodiments of the present disclosure, the number of the sub-pixel rows of the pixel subgroup is 1, 2, 3 or 4.

In embodiments of the present disclosure, the adjacent sub-pixel rows are arranged as deviating from each other by a half of the width of the sub-pixel, and the sub-pixels of the same color on the sub-pixel rows spaced from each other by one row are aligned with one another.

In embodiments of the present disclosure, each pixel group includes four sub-pixel rows, the sub-pixel rows on odd lines constitute a first pixel subgroup, and the sub-pixel rows on even lines constitute a second pixel subgroup. Within one pixel subgroup of the first pixel subgroup and the second pixel subgroup, the first shelters on one sub-pixel row are aligned with the second shelters on the other sub-pixel row, and the second shelters on the one sub-pixel row are aligned with the first shelters on the other sub-pixel row. Within the other pixel subgroup of the first pixel subgroup and the second pixel subgroup, the first shelters on different sub-pixel rows are aligned with one another, and the second shelters on different sub-pixel rows are aligned with one another.

In embodiments of the present disclosure, each pixel group includes six sub-pixel rows. The sub-pixel rows on odd lines constitute a first pixel subgroup, and the sub-pixel rows on even lines constitute a second pixel subgroup. Within one pixel subgroup of the first pixel subgroup and the second pixel subgroup, the first shelters on the middle sub-pixel row are aligned with the second shelters on the upper and lower sub-pixel rows, and the second shelters on the middle sub-pixel row are aligned with the first shelters on the upper and lower sub-pixel rows. Within the other pixel subgroup of the first pixel subgroup and the second pixel subgroup, the first shelters on the middle sub-pixel row are aligned with the second shelters on one of the upper and lower sub-pixel rows and are aligned with the first shelters on the other of the upper and lower sub-pixel rows, and the second shelters on the middle sub-pixel row are aligned with the first shelters on the one of the upper and lower sub-pixel rows and are aligned with the second shelters on the other of the upper and lower sub-pixel rows.

In embodiments of the present disclosure, the array substrate further includes a plurality of gate lines arranged in a direction parallel to the sub-pixel rows and a plurality of data lines perpendicular to the gate lines. At each side of each sub-pixel row, one gate line dedicated to the sub-pixel row is arranged. Within each sub-pixel row, one data line is arranged every two sub-pixels.

In embodiments of the present disclosure, the first shelter is configured to shelter the data line, the second shelter is configured to shelter a common electrode between the two sub-pixels, and the second width is less than the first width.

A second aspect of the present disclosure provides a display panel, which includes the array substrate as mentioned above.

A third aspect of the present disclosure provides a display device, which includes the display panel as mentioned above.

BRIEF DESCRIPTION OF DRAWINGS

To describe technical solutions of the embodiments of the present disclosure more clearly, the accompanying drawings of the embodiments will be briefly introduced in the following. It should be known that the accompanying drawings in the following description merely involve some embodiments of the present disclosure, but do not limit the present disclosure, in which.

In the accompanying drawings, numerals whose last two digits are the same correspond to the same elements. It is to be noted that the elements in the accompanying drawings are exemplary and are not drawn to scale.

DETAILED DESCRIPTION

To make the technical solutions and advantages of the embodiments of the present disclosure clearer, the technical solutions in the embodiments of the present disclosure will be described clearly and completely below, in conjunction with the accompanying drawings in the embodiments of the present disclosure. Obviously, the described embodiments are merely some but not all of the embodiments of the present disclosure. All other embodiments obtained by those skilled in the art based on the described embodiments of the present disclosure without creative efforts shall fall within the protecting scope of the present disclosure.

Unless otherwise defined, all terms (including technical and scientific terms) used herein have the same meaning as commonly understood by those skilled in the art to which present disclosure belongs. It will be further understood that terms, such as those defined in commonly used dictionaries, should be interpreted as having a meaning that is consistent with their meaning in the context of the specification and will not be interpreted in an idealized or overly formal sense unless expressly so defined herein. As used herein, the description of "connecting" or "coupling" two or more parts together should refer to the parts being directly combined together or being combined via one or more intermediate components. In addition, terms such as "first" and "second" are only used to distinguish one element (or a part of the element) from another element (or another part of this element).

An array substrate for a display device includes a plurality of gate lines arranged in a direction parallel to the sub-pixel rows and a plurality of data lines perpendicular to the gate lines. At each side of each sub-pixel row, one gate line dedicated to the sub-pixel row is arranged. In each sub-pixel row, one data line is arranged every two sub-pixels. On such an array substrate, widths of black matrixes between adjacent sub-pixels are different, and such a phenomenon is referred to as a black matrix difference. The embodiments of the present disclosure are described by taking the above array substrate as an example. However, the protection scope of the present disclosure is not limited to the array substrate. That is, other types of array substrates may also be included.

Figure 1:
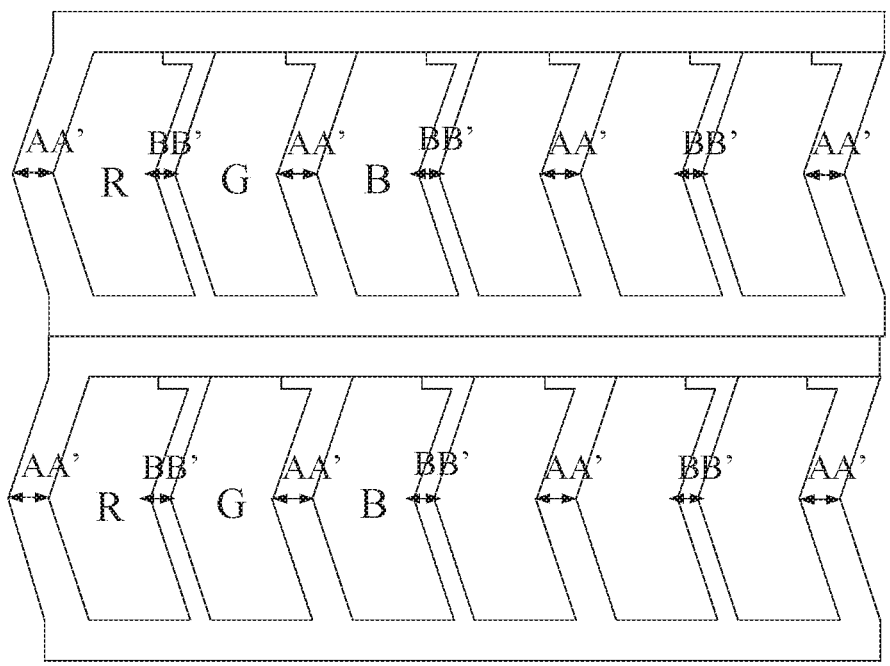
FIG. 1 is a schematic diagram schematically illustrating black matrix difference.

FIG. 1 is a schematic diagram schematically illustrating black matrix difference. As shown in FIG. 1, in a row direction, a width of the black matrix at the left of a sub-pixel R is AA', and the width of the black matrix at the right of the sub-pixel R is BB'. The black matrix of width AA' is configured to shelter a data line, and thus its width is set according to a design rule of the black matrix. The black matrix of width BB' is configured to shelter a common electrode, and thus its width may be adjusted within a certain range. The narrower the black matrix of width BB' is, the greater the black matrix difference (namely, (AA'-BB')/the width between the two sub-pixels) is. In this way, the aperture ratio increases, but the brightness distribution difference between the two pixels also increases, thereby causing pixel display difference when displaying images of low gray scale. That is, a phenomenon of periodic vertical stripes (such as light and dark stripes on a white image) may occur in the case of viewing the displayed image on a screen from different distances at different angles.

Figure 2:
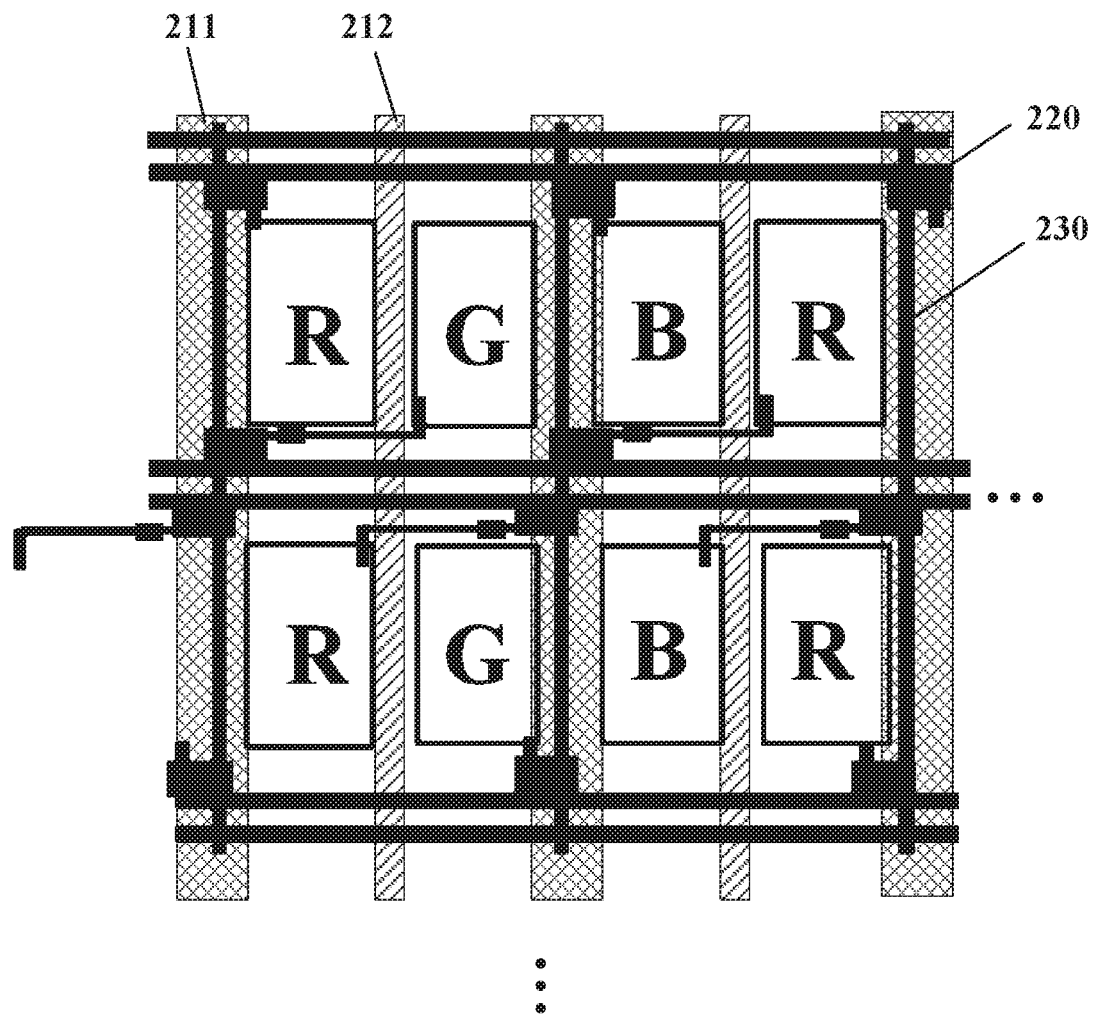
FIG. 2 is a schematic structural diagram of an array substrate adopting a basic pixel structure.

FIG. 2 illustrates a schematic structural diagram of an array substrate adopting a basic pixel structure. As shown in FIG. 2, the pixel structure having the sub-pixels of the same color on different sub-pixel rows being aligned with one another is referred to as a "basic pixel structure" hereinafter. The array substrate as shown in FIG. 2 includes a plurality of gate lines 220 arranged in a direction parallel to the sub-pixel rows, a plurality of data lines 230 perpendicular to the gate lines, and a plurality of common electrodes (not shown). On the array substrate as shown in FIG. 2, at each side of each sub-pixel row, one gate line 220 dedicated to the sub-pixel row is arranged. In each sub-pixel row, one data line 230 is arranged every two sub-pixels. A first shelter 211 (namely, the black matrix of width AA' in FIG. 1) is configured to shelter the data line 230, and thus its width is set according to a design rule of the black matrix. Whereas a second shelter 212 (namely, the black matrix of width BB' in FIG. 1) is configured to shelter a common electrode, and thus its width may be adjusted within a certain range. As shown in FIG. 2, the first shelters 211 on different sub-pixel rows are aligned with each other, and the second shelters 212 on different sub-pixel rows are aligned with one another.

Figure 3:
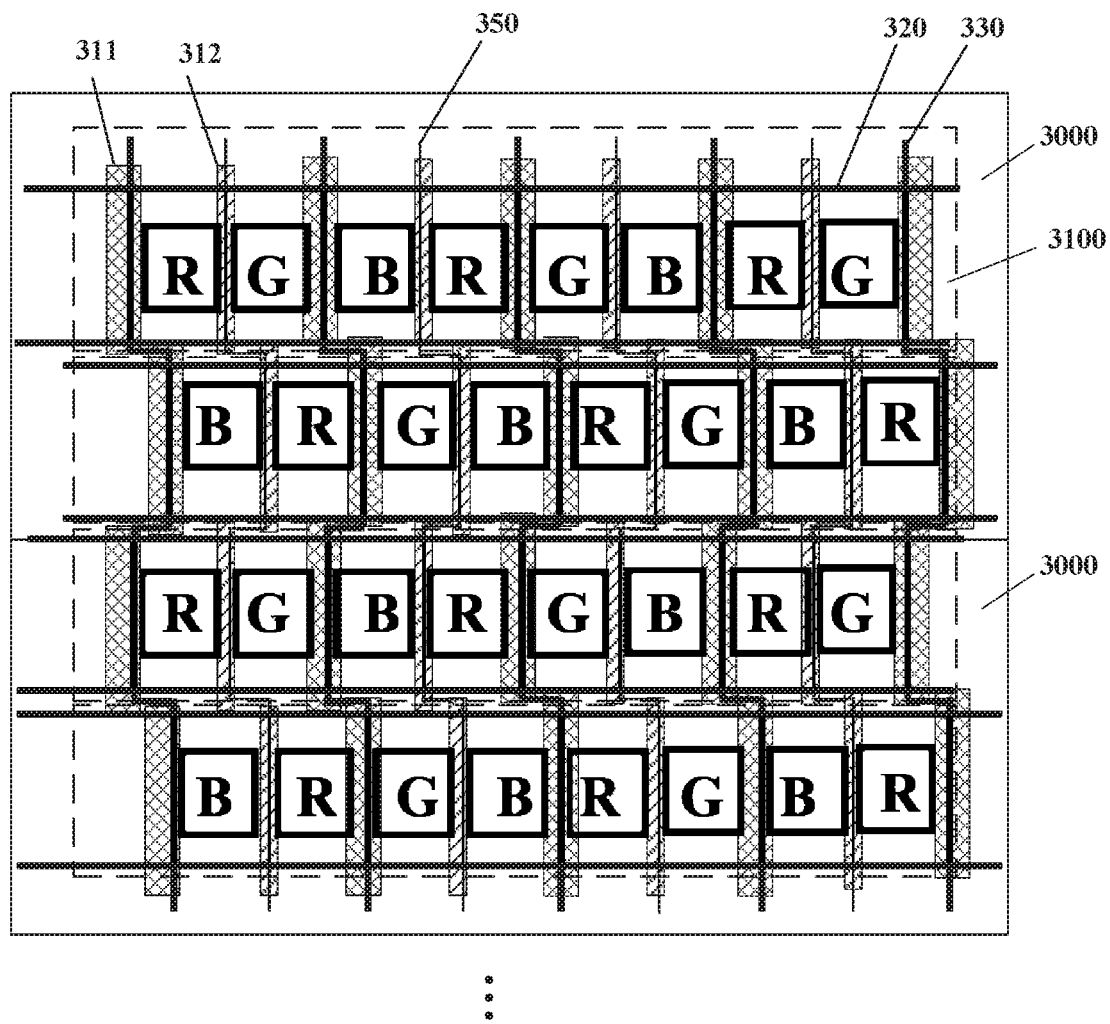
FIG. 3 is a schematic structural diagram of an array substrate adopting a Bright View 3 (BV3) pixel structure.

FIG. 3 illustrates a schematic structural diagram of an array substrate adopting a Bright View 3 (BV3) pixel structure. The array substrate includes a plurality of gate lines 320 arranged in a direction parallel to the sub-pixel rows, a plurality of data lines 330 perpendicular to the gate lines, and a plurality of common electrodes 350. On the array substrate, at each side of each sub-pixel row, one gate line 320 dedicated to the sub-pixel row is respectively arranged. In each sub-pixel row, one data line 330 is arranged every two sub-pixels. The common electrode 350 is positioned between the two sub-pixels. The pixel structure having the sub-pixel rows adjacent to each other as shown in FIG. 3 being arranged as deviating from each other by a half of the width of the sub-pixel, and having the sub-pixels of the same color on the sub-pixel rows spaced from each other by one row being aligned with one another is referred to as a "BV3 pixel structure". The array substrate having such a structure includes a plurality of pixel groups 3000 arranged along a column direction. As shown in FIG. 3, in a BV3 pixel structure, each pixel group 3000 includes two sub-pixel rows 3100. The sub-pixel rows adjacent to each other are arranged in a staggered manner, and thus the first shelters 311 and the second shelters 312 on different sub-pixel rows 3100 are not aligned with one another. However, since each pixel group 3000 is identical in structure and aligned with one another, the first shelters 311 on the first sub-pixel row 3100 of one pixel group 3000 are aligned with the first shelters 311 on the first sub-pixel rows 3100 of other pixel groups 3000. The second shelters 312 on the first sub-pixel row 3100 of one pixel group 3000 are aligned with the second shelters 312 on the first sub-pixel rows 3100 of other pixel groups 3000. The first shelters 311 on the second sub-pixel row 3100 of one pixel group 3000 are aligned with the first shelters 311 on the second sub-pixel rows 3100 of other pixel groups 3000. The second shelters 312 on the second sub-pixel row 3100 of one pixel group 3000 are aligned with the second shelters 312 on the second sub-pixel rows 3100 of other pixel groups 3000.

The array substrate adopting the above two types of pixel structures (the basic pixel structure and the BV3 pixel structure) has the problem of pixel display difference when displaying image of low gray scale. One solution is to increase the width of the second shelter so as to reduce the black matrix difference. However, this solution may sacrifice the aperture ratio.

Figure 4:
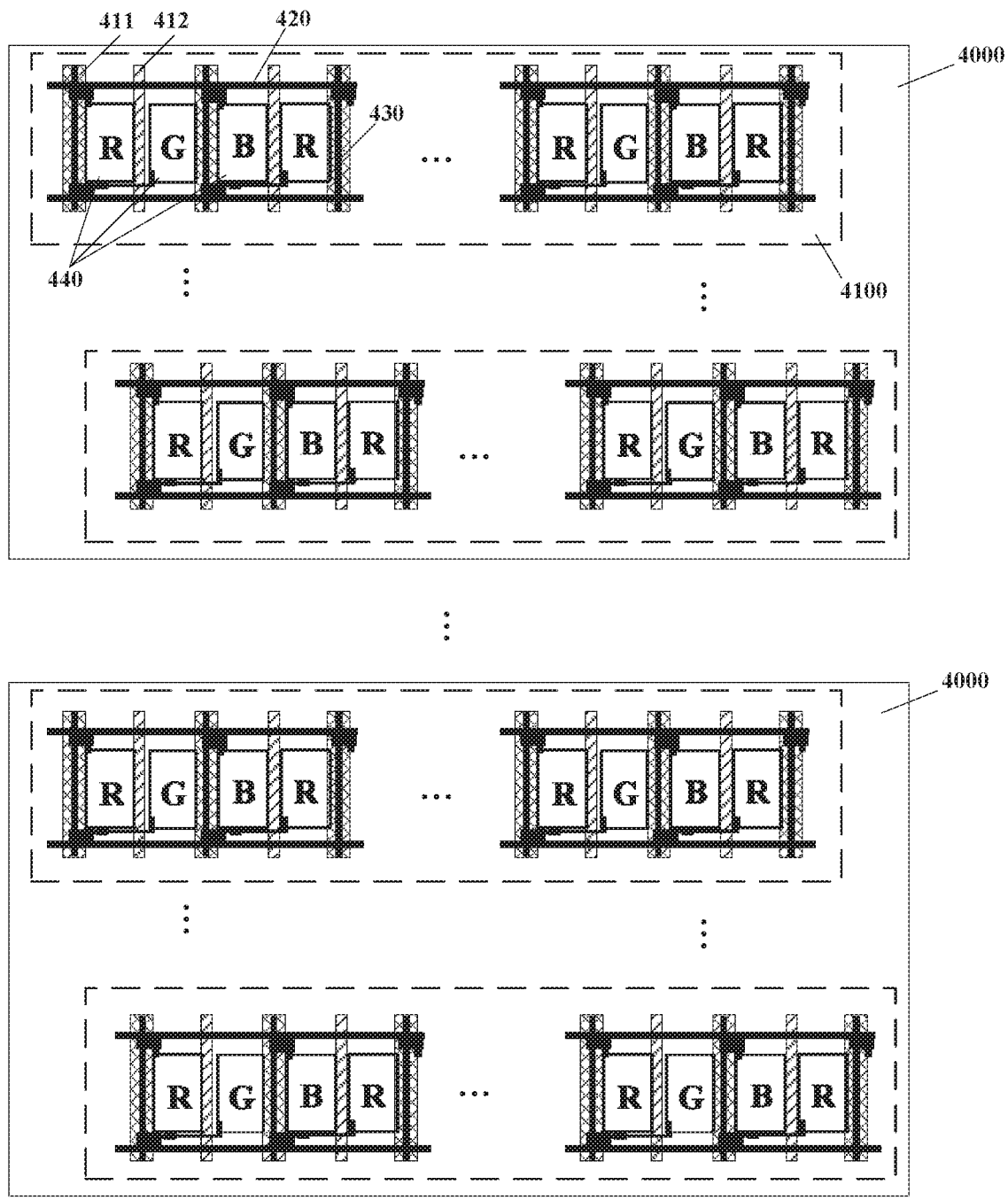
FIG. 4 is a schematic structural diagram of an array substrate according to an exemplary embodiment of the present disclosure.

An embodiment of the present disclosure provides a new-type array substrate, which can avoid pixel display difference when displaying images of low gray scale, without reducing an aperture ratio. FIG. 4 illustrates a schematic structural diagram of an array substrate according to an exemplary embodiment of the present disclosure. The array substrate includes a plurality of gate lines 420 arranged in a direction parallel to the sub-pixel rows, a plurality of data lines 430 perpendicular to the gate lines, and a plurality of common electrodes (not shown). On the array substrate, at each side of each sub-pixel row, one gate line 420 dedicated to the sub-pixel row is arranged. In each sub-pixel row, one data line 430 is arranged every two sub-pixels 440. The array substrate according to the exemplary embodiment of the present disclosure includes a plurality of pixel groups 4000 arranged along a column direction. Each pixel group 4000 is identical in structure and aligned with one another. Each pixel group 4000 includes a plurality of sub-pixel rows 4100. A first shelter 411 or a second shelter 412 is arranged alternately between two adjacent sub-pixels 440 in each sub-pixel row 4100. For each pixel group 4000, the first shelters 411 on at least one of the sub-pixel rows 4100 are aligned with the second shelters 412 on at least one of another sub-pixel rows 4100. The first shelter 411 has a first width, and the second shelter 412 has a second width.

In one example, the first shelter 411 is configured to shelter a data line 430, and the second shelter 412 is configured to shelter a common electrode (not shown). The width of the common electrode is less than that of the data line 430, and thus the width of the second shelter 412 is less than that of the first shelter 411.

In the case that the width of the first shelter 411 is different from that of the second shelter 412, the array substrate according to the embodiments of the present disclosure can avoid, by changing the arrangement of the first shelter 411 and the second shelter 412 such that the brightness distribution difference between the pixels in a column direction is reduced, pixel display difference when displaying images of low gray scale, without reducing an aperture ratio.

Exemplary embodiments of the present disclosure will be described below with respect to different pixel structures.

Figure 5:
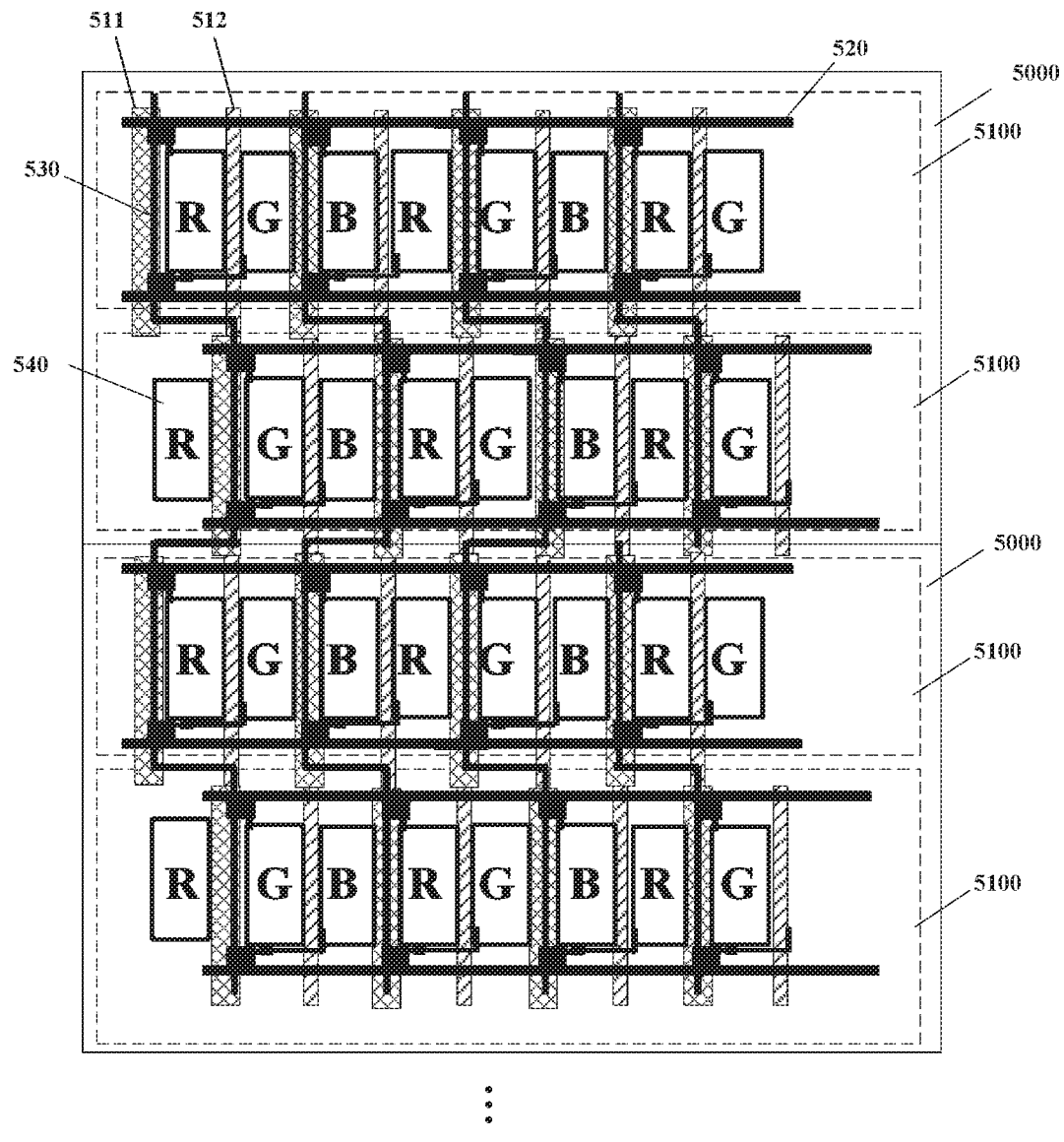
FIG. 5 is a schematic structural diagram of an array substrate adopting a basic pixel structure according to an exemplary embodiment of the present disclosure.

FIG. 5 illustrates a schematic structural diagram of an array substrate adopting a basic pixel structure according to an exemplary embodiment of the present disclosure. The array substrate includes a plurality of gate lines 520 arranged in a direction parallel to the sub-pixel rows, a plurality of data lines 530 perpendicular to the gate lines, and a plurality of common electrodes (not shown). On the array substrate, at each side of each sub-pixel row, one gate line 520 dedicated to the sub-pixel row is arranged. In each sub-pixel row, one data line 530 is arranged every two sub-pixels. Each pixel group 5000 includes two sub-pixel rows 5100. A first shelter 511 or a second shelter 512 is arranged alternately between two adjacent sub-pixels 540 in each sub-pixel row 5100. The first shelter 511 has a first width, and the second shelter 512 has a second width. In this embodiment, the first shelters 511 on one sub-pixel row 5100 are aligned with the second shelters 512 on the other sub-pixel row 5100, and the second shelters 512 on the sub-pixel row 5100 are aligned with the first shelters 511 on the other sub-pixel row 5100. That is, on the array substrate according to this embodiment, the first shelters 511 and the second shelters 512 are also arranged alternately in the column direction. Therefore, the number of the first shelters 511 is equal to that of the second shelters 512 in each column of shelters, thereby ensuring a uniform brightness distribution among the sub-pixel columns. Therefore, according to this embodiment, pixel display difference when displaying images of low gray scale can be avoided, without reducing an aperture ratio.

In this embodiment, the first shelter 511 is configured to shelter the data line 530. The first shelters 511 and the second shelters 512 are arranged alternately in the column direction. Therefore, on the array substrate according to this embodiment, as shown in FIG. 5, the data lines 530 has a shape like letter 'Z'. The Z-shaped routing mode may increase a line resistance, and thus a voltage of a data signal transmitted over the data line 530 may be affected.

Figure 6:
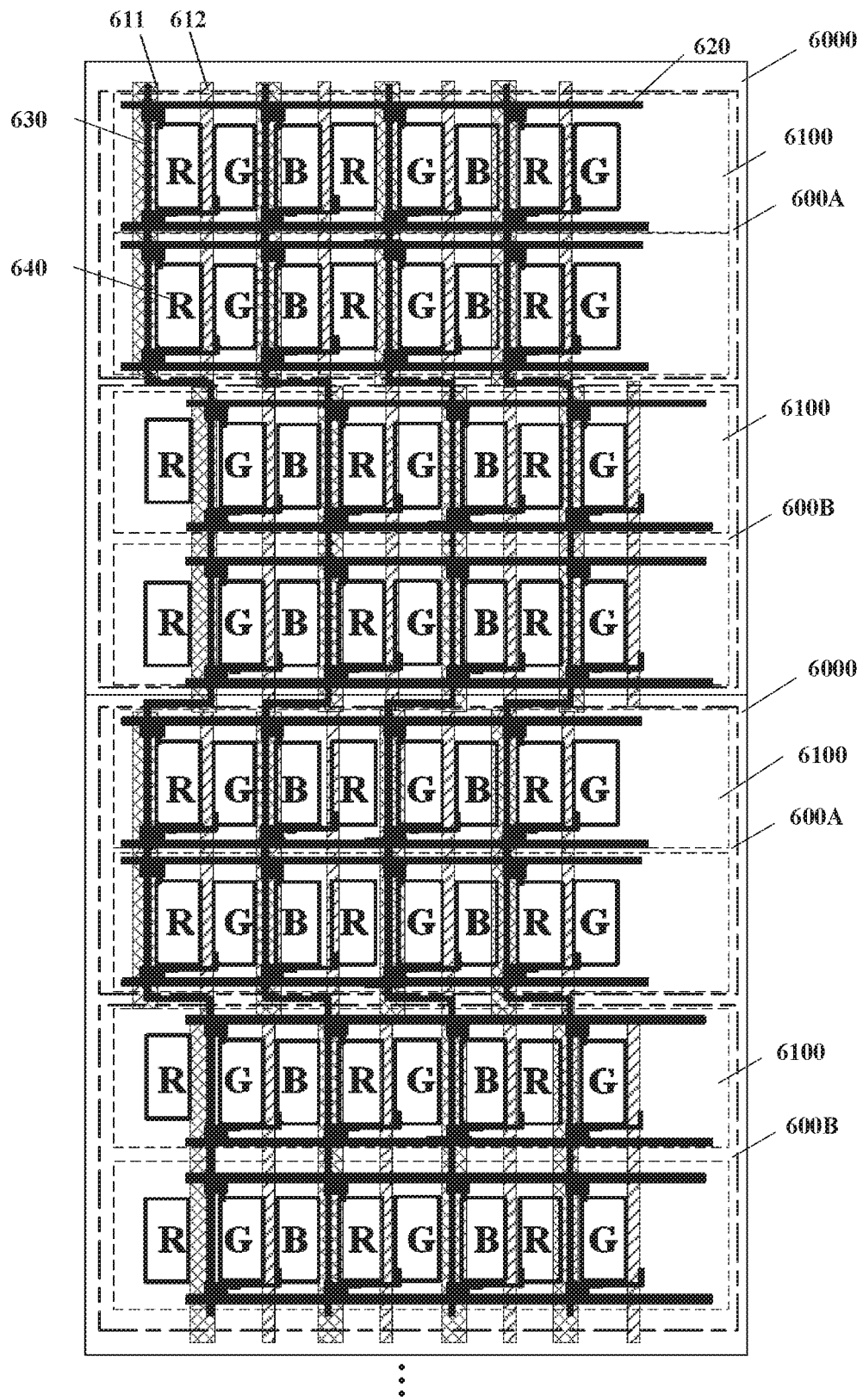
FIG. 6 is a schematic structural diagram of an array substrate adopting a basic pixel structure according to another exemplary embodiment of the present disclosure.

Another exemplary embodiment of the present disclosure provides another array substrate adopting the basic pixel structure. In the array substrate, each pixel group includes more than two sub-pixel rows. FIG. 6 illustrates a schematic structural diagram of an array substrate adopting the basic pixel structure according to this exemplary embodiment of the present disclosure. The array substrate includes a plurality of gate lines 620 arranged in a direction parallel to the sub-pixel rows 6100, a plurality of data lines 630 perpendicular to the gate lines, and a plurality of common electrodes (not shown). On the array substrate, at each side of each sub-pixel row 6100, one gate line 620 dedicated to the sub-pixel row 6100 is arranged. In each sub-pixel row 6100, one data line 630 is arranged every two sub-pixels 640. Each pixel group 6000 may include more than two sub-pixel rows 6100. Each pixel group 6000 is divided, in the column direction, into a first pixel subgroup 600A and a second pixel subgroup 600B. The first pixel subgroup 600A may include N sub-pixel rows 6100, whereas the second pixel subgroup 600B may include M sub-pixel rows 6100. In each pixel subgroup, the first shelters 611 on different sub-pixel rows 6100 are aligned with one another, and the second shelters 612 on different sub-pixel rows 6100 are aligned with one another. The first shelters 611 on each sub-pixel row 6100 in the first pixel subgroup 600A are aligned with the second shelters 612 on each sub-pixel row 6100 in the second pixel subgroup 600B. The second shelters 612 on each sub-pixel row 6100 in the first pixel subgroup 600A are aligned with the first shelters 611 on each sub-pixel row 6100 in the second pixel subgroup 600B. In one example, the N and the M may be any value from one to four, and the N may be equal to the M.

This exemplary embodiment is described in more detail below by taking an example in which each pixel group 6000 includes four sub-pixel rows 6100. Each pixel group 6000 is divided, in the column direction, into a first pixel subgroup 600A and a second pixel subgroup 600B. The first pixel subgroup 600A includes a first sub-pixel row 6100 and a second sub-pixel row 6100. The second pixel subgroup 600B includes a third sub-pixel row 6100 and a forth sub-pixel row 6100. In the first pixel subgroup 600A, the first shelters 611 on the first sub-pixel row 6100 and the second sub-pixel row 6100 are aligned with one another, and the second shelters 612 on the first sub-pixel row 6100 and the second sub-pixel row 6100 are aligned with one another. In the second pixel subgroup 600B, the first shelters 611 on the third sub-pixel row 6100 and the forth sub-pixel row 6100 are aligned with one another, and the second shelters 612 on the third sub-pixel row 6100 and the forth sub-pixel row 6100 are aligned with one another. Furthermore, the first shelters 611 on the first sub-pixel row 6100 and the second sub-pixel row 6100 are aligned with the second shelters 612 on the third sub-pixel row 6100 and the forth sub-pixel row 6100. The second shelters 612 on the first sub-pixel row 6100 and the second sub-pixel row 6100 are aligned with the first shelters 611 on the third sub-pixel row 6100 and the forth sub-pixel row 6100.

Adopting the arrangement according to this exemplary embodiment may ensure a uniform brightness distribution among sub-pixel columns. Therefore, in this embodiment, pixel display difference when displaying images of low gray scale can be avoided, without reducing the aperture ratio. Because the Z-shaped routings of the data lines are reduced, in this embodiment the line resistances of the data lines can also be reduced with respect to the exemplary embodiment in FIG. 5.

Figure 7:
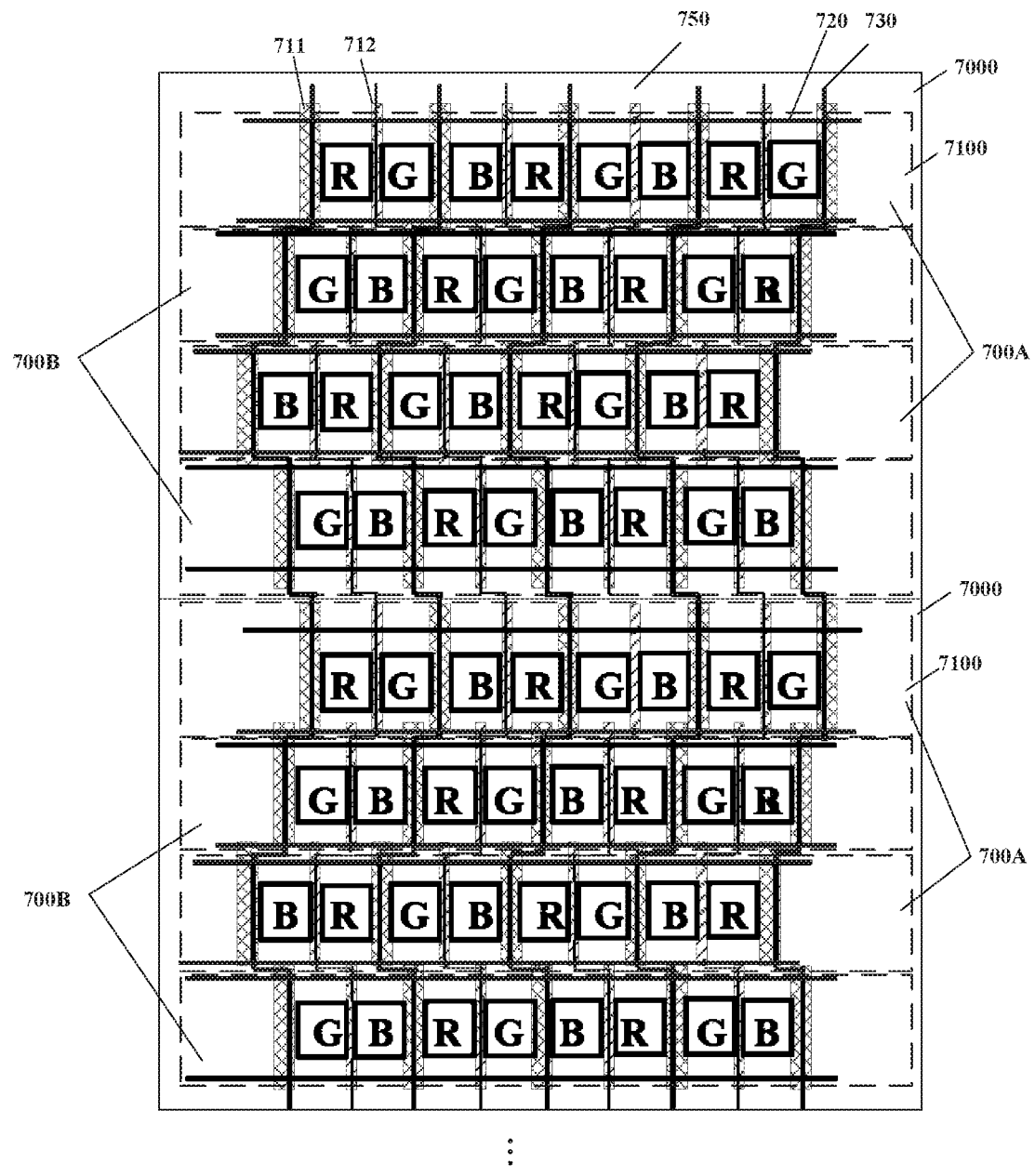
FIG. 7 is a schematic structural diagram of an array substrate adopting a BV3 pixel structure according to yet another exemplary embodiment of the present disclosure.

FIG. 7 illustrates a schematic structural diagram of an array substrate adopting a BV3 pixel structure according to yet another exemplary embodiment of the present disclosure. The array substrate includes a plurality of gate lines 720 arranged in a direction parallel to the sub-pixel rows, a plurality of data lines 730 perpendicular to the gate lines, and a plurality of common electrodes 750. On the array substrate, at each side of each sub-pixel row, one gate line 720 dedicated to the sub-pixel row is arranged. In each sub-pixel row, one data line 730 is arranged every two sub-pixels. The common electrode 750 is positioned between the two sub-pixels. Each pixel group 7000 includes four sub-pixel rows 7100. Each pixel group 7000 is divided, in the column direction, into a first pixel subgroup 700A and a second pixel subgroup 700B. The first pixel subgroup 700A includes sub-pixel rows 7100 on odd lines. The second pixel subgroup 700B includes sub-pixel rows 7100 on even lines. In one pixel subgroup (for example, the first pixel subgroup 700A) of the first pixel subgroup 700A and the second pixel subgroup 700B, the first shelters 711 on one sub-pixel row 7100 are aligned with the second shelters 712 on the other sub-pixel row 7100, and the second shelters 712 on the one sub-pixel row 7100 are aligned with the first shelters 711 on the other sub-pixel row 7100. In the other pixel subgroup (for example, the second pixel subgroup 700B) of the first pixel subgroup 700A and the second pixel subgroup 700B, the first shelters 711 on different sub-pixel rows 7100 are aligned with one another, and the second shelters 712 on different sub-pixel rows 7100 are aligned with one another. Such an arrangement can avoid pixel display difference when displaying images of low gray scale, without reducing the aperture ratio.

Figure 8:
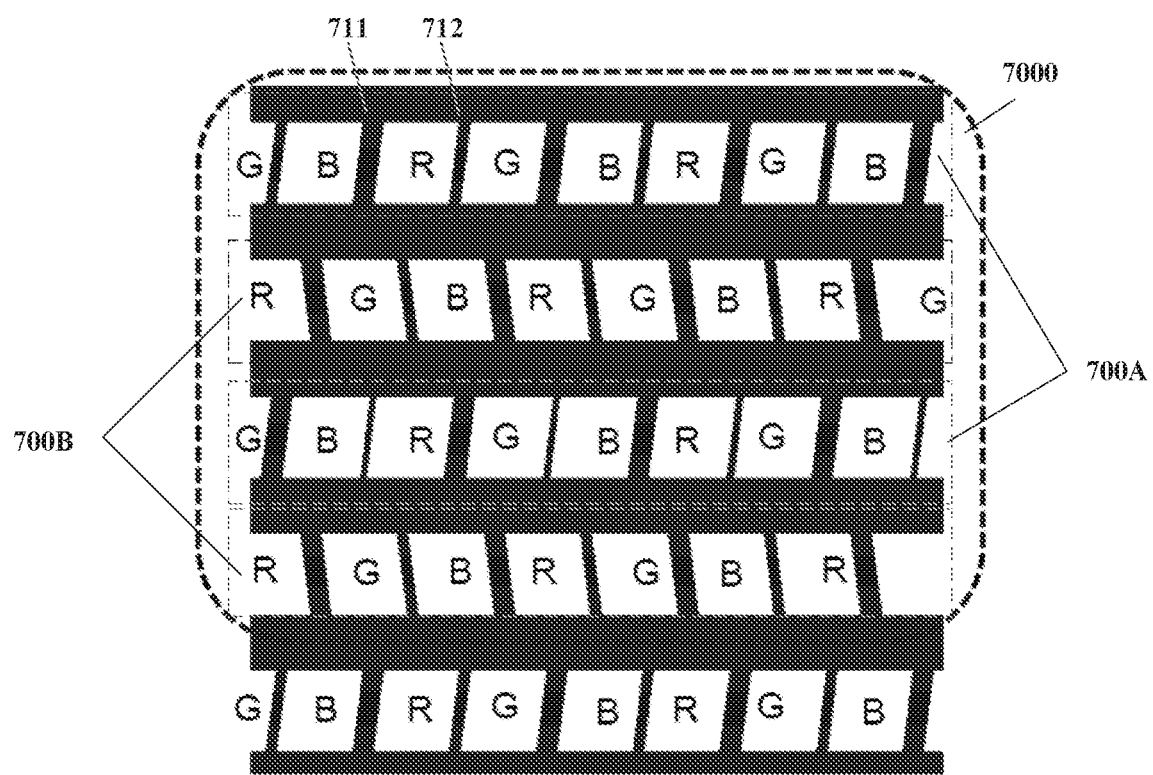
FIG. 8 is a schematic diagram illustrating a design of the array substrate as shown in FIG. 7.

FIG. 8 is a schematic diagram illustrating a design of the array substrate as shown in FIG. 7. In order to facilitate understanding, like reference numerals refer to identical elements, parts or combination thereof in FIG. 7 and FIG. 8.

Figure 9:
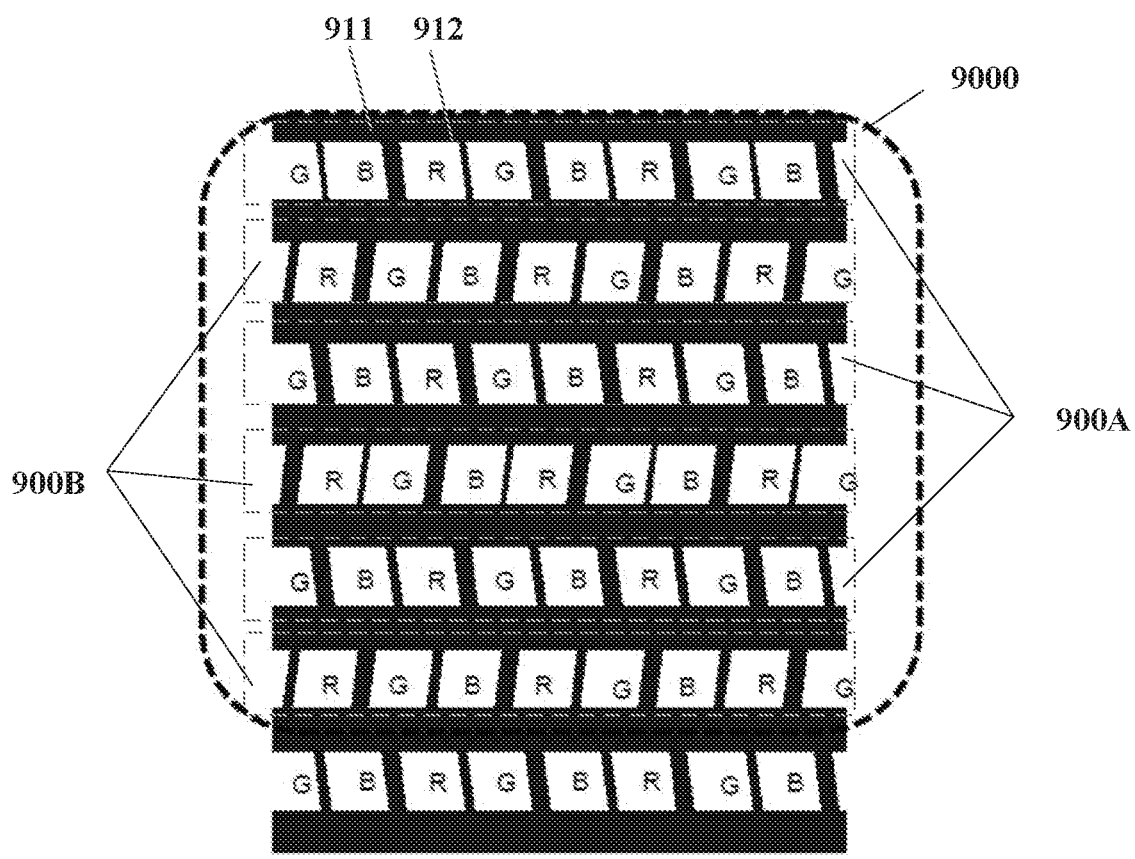
FIG. 9 is a schematic diagram illustrating a design of an array substrate adopting a BV3 pixel structure according to still another exemplary embodiment of the present disclosure.

FIG. 9 is a schematic diagram illustrating a design of an array substrate adopting a BV3 pixel structure according to still another exemplary embodiment of the present disclosure. Each pixel group 9000 includes six sub-pixel rows 9100. Each pixel group 9000 is divided, in the column direction, into a first pixel subgroup 900A and a second pixel subgroup 900B. The first pixel subgroup 900A includes sub-pixel rows 9100 on odd lines. The second pixel subgroup 900B includes sub-pixel rows 9100 on even lines. In one pixel subgroup (for example, the second pixel subgroup 900B) of the first pixel subgroup 900A and the second pixel subgroup 900B, the first shelters 911 on the middle sub-pixel row 9100 are aligned with the second shelters 912 on the upper and lower sub-pixel rows 9100, and the second shelters 912 on the middle sub-pixel row 9100 are aligned with the first shelters 911 on the upper and lower sub-pixel rows 9100. In the other pixel subgroup (for example, the first pixel subgroup 900A) of the first pixel subgroup 900A and the second pixel subgroup 900B, the first shelters 911 on the middle sub-pixel row 9100 are aligned with the second shelters 912 on one sub-pixel row 9100 of the upper and lower sub-pixel rows 9100 and are aligned with the first shelters 911 on the other sub-pixel row 9100 of the upper and lower sub-pixel rows 9100, and the second shelters 912 on the middle sub-pixel row 9100 are aligned with the first shelters 911 on one sub-pixel row 9100 of the upper and lower sub-pixel rows 9100 and are aligned with the second shelters 912 on the other sub-pixel row 9100 of the upper and lower sub-pixel rows 9100. Compared with the design of the exemplary embodiment in FIGS. 7 and 8, in the design of this exemplary embodiment, the arrangement of the first shelters 911 and the second shelters 912 are changed in both the first pixel subgroup 900A and the second pixel subgroup 900B. Therefore, pixel display difference when displaying images of low gray scale can be better avoided, without reducing the aperture ratio.

Those skilled in the art should understand that for the array substrate adopting the BV3 pixel structure, the number of the sub-pixel rows included in each pixel group may be more than six in variants or modifications of the exemplary embodiment in FIGS. 7 and 8 and the exemplary embodiment in FIG. 9 of the present disclosure. The variants or modifications of the arrangement of the first shelters and the second shelters based on the ideas of the present disclosure should fall in the protection scope of the present disclosure.

Figure 10:
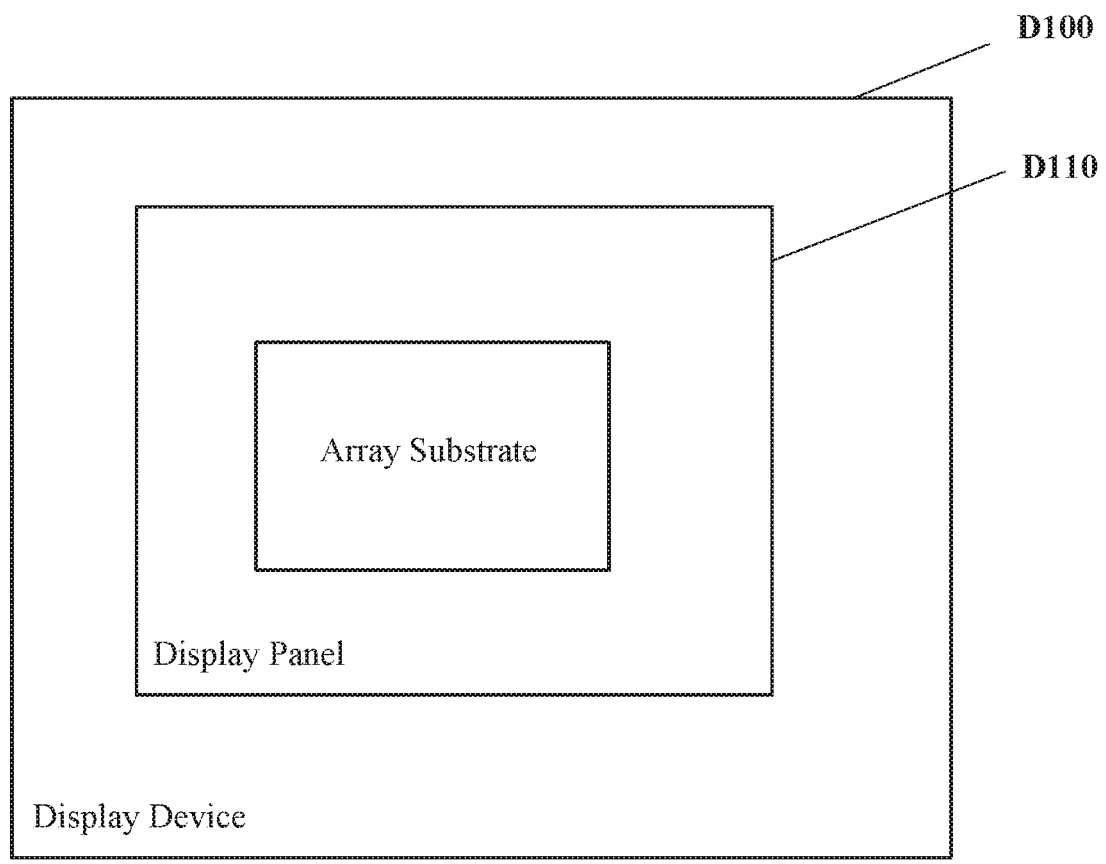
FIG. 10 is a schematic structural diagram of a display device according to an embodiment of the present disclosure.

FIG. 10 illustrates a schematic structural diagram of a display device D100 according to an embodiment of the present disclosure. The display device D100 includes a display panel D110, and the display panel D110 includes the array substrate according to any of the above embodiments. Therefore, description of the structure, function and effect of the array substrate in the above embodiments is also applicable to the display panel D110 and the display device D100 in this embodiment.

As can be seen from the above description, the array substrate, the display panel and the display device according to the embodiments of the present disclosure can avoid pixel display difference when displaying images of low gray scale, without reducing the aperture ratio.

The display apparatus provided by the embodiments of the present disclosure may be used in any product having a display function, such as an electronic paper display, a mobile phone, a tablet computer, a TV set, a notebook computer, a digital photo frame or a navigation apparatus, and so on.

As used herein and in the appended claims, the singular form of a word includes the plural, and vice versa, unless the context clearly dictates otherwise. Thus, singular words are generally inclusive of the plurals of the respective terms.

Similarly, the words "include" and "comprise" are to be interpreted as inclusively rather than exclusively. Likewise, the terms "include" and "or" should be construed to be inclusive, unless such an interpretation is clearly prohibited from the context. Where used herein the term "examples," particularly when followed by a listing of terms is merely exemplary and illustrative, and should not be deemed to be exclusive or comprehensive.

Further adaptive aspects and scopes become apparent from the description provided herein. It should be understood that various aspects of the present disclosure may be implemented separately or in combination with one or more other aspects. It should also be understood that the description and specific embodiments in the present disclosure are intended to describe rather than limit the scope of the present disclosure.

A plurality of embodiments of the present disclosure has been described in detail above. However, apparently those skilled in the art may make various modifications and variations on the embodiments of the present disclosure without departing from the spirit and scope of the present disclosure. The scope of protecting of the present disclosure is limited by the appended claims.

What is claimed is:

1. An array substrate comprising a plurality of pixel groups arranged along a column direction,
    wherein each of the plurality of pixel groups comprises a plurality of sub-pixel rows;
    wherein each sub-pixel row comprises a plurality of sub-pixels, a first shelter and a second shelter, and the first shelter or the second shelter is arranged alternately between two adjacent sub-pixels;
    wherein the first shelter has a first width, and the second shelter has a second width different than the first width;
    wherein for each pixel group, the first shelters on at least one of the sub-pixel rows are aligned with the second shelters on at least one of the other sub-pixel rows;
    wherein for each pixel group, sub-pixels of the same color on different sub-pixel rows are aligned with one another;
    wherein each pixel group is divided into two pixel subgroups along the column direction;
    wherein each pixel subgroup comprises successive sub-pixel rows;
    wherein in each pixel subgroup, the first shelters on different sub-pixel rows are aligned with one another, and the second shelters on different sub-pixel rows are aligned with one another; and
    wherein the first shelters on each sub-pixel row of one pixel subgroup of the two pixel subgroups are aligned with the second shelters on each sub-pixel row of the other pixel subgroup, and the second shelters on each sub-pixel row of the one pixel subgroup are aligned with the first shelters on each sub-pixel row of the other pixel subgroup.

2. The array substrate according to claim 1, wherein the number of the sub-pixel rows of the pixel subgroup is 1, 2, 3 or 4.

3. The array substrate according to claim 1, further comprising a plurality of gate lines arranged in a direction parallel to the sub-pixel rows and a plurality of data lines arranged perpendicular to the gate lines,
    wherein at each side of each sub-pixel row, one gate line is dedicated to the sub-pixel row; and
    wherein within each sub-pixel row, one data line is arranged every two sub-pixels.

4. The array substrate according to claim 3, wherein the first shelter is configured to shelter the data line, and the second shelter is configured to shelter a common electrode between the two sub-pixels, and
    wherein the second width is less than the first width.

5. A display panel comprising the array substrate according to claim 1.

6. A display device comprising the display panel according to claim 5.

7. An array substrate comprising a plurality of pixel groups arranged along a column direction,
    wherein each of the plurality of pixel groups comprises a plurality of sub-pixel rows;
    wherein each sub-pixel row comprises a plurality of sub-pixels, a first shelter and a second shelter, and the first shelter or the second shelter is arranged alternately between two adjacent sub-pixels;
    wherein the first shelter has a first width, and the second shelter has a second width different from the first width;
    wherein for each pixel group, the first shelters on at least one of the sub-pixel rows are aligned with the second shelters on at least one of the other sub-pixel rows;
    wherein adjacent sub-pixel rows are arranged as deviating from each other by a half of the width of the sub-pixel;
    wherein each sub-pixel has the same width along a deviating direction; and
    wherein the sub-pixels of the same color on the sub-pixel rows spaced from each other by one row are aligned with one another.

8. The array substrate according to claim 7, wherein each pixel group comprises four sub-pixel rows, the sub-pixel rows on odd lines constitute a first pixel subgroup, and the sub-pixel rows on even lines constitute a second pixel subgroup;
    wherein within one pixel subgroup of the first pixel subgroup and the second pixel subgroup, the first shelters on one sub-pixel row are aligned with the second shelters on the other sub-pixel row, and the second shelters on the one sub-pixel row are aligned with the first shelters on the other sub-pixel row; and
    wherein within the other pixel subgroup of the first pixel subgroup and the second pixel subgroup, the first shelters on different sub-pixel rows are aligned with one another, and the second shelters on different sub-pixel rows are aligned with one another.

9. The array substrate according to claim 7, wherein each pixel group comprises six sub-pixel rows,
    wherein the sub-pixel rows on odd lines constitute a first pixel subgroup, and the sub-pixel rows on even lines constitute a second pixel subgroup,
    wherein within one pixel subgroup of the first pixel subgroup and the second pixel subgroup, the first shelters on the middle sub-pixel row are aligned with the second shelters on the upper and lower sub-pixel rows, and the second shelters on the middle sub-pixel row are aligned with the first shelters on the upper and lower sub-pixel rows; and
    wherein within the other pixel subgroup of the first pixel subgroup and the second pixel subgroup, the first shelters on the middle sub-pixel row are aligned with the second shelters on one of the upper and lower sub-pixel rows and are aligned with the first shelters on the other of the upper and lower sub-pixel rows, and the second shelters on the middle sub-pixel row are aligned with the first shelters on the one of the upper and lower sub-pixel rows and are aligned with the second shelters on the other of the upper and lower sub-pixel rows.

10. The array substrate according to claim 7, further comprising a plurality of gate lines arranged in a direction parallel to the sub-pixel rows and a plurality of data lines arranged perpendicular to the gate lines, wherein at each side of each sub-pixel row, one gate line is dedicated to the sub-pixel row; and wherein within each sub-pixel row, one data line is arranged every two sub-pixels.

11. The array substrate according to claim 10, wherein the first shelter is configured to shelter the data line, and the second shelter is configured to shelter a common electrode between the two sub-pixels, and wherein the second width is less than the first width.

12. A display panel comprising the array substrate according to claim 7.

13. A display device comprising the display panel according to claim 12.

* * * * *